United States Patent [19]
Pshenichny et al.

[11] 3,750,667
[45] Aug. 7, 1973

[54] DEVICE FOR INTRAOSSEOUS INJECTION OF LIQUID SUBSTANCES

[76] Inventors: Nikolai Fedorovich Pshenichny, Khmelnilshoe 29, kv. 6; Valentin Dmitrievich Maximov, ulitsa Krasnoznamennaya 9, both of Vinnitsa, U.S.S.R.

[22] Filed: Jan. 31, 1972

[21] Appl. No.: 221,926

[52] U.S. Cl. .............................................. 128/215
[51] Int. Cl. .......................................... A61m 5/00
[58] Field of Search .................... 128/215, 2 B, 221, 128/347

[56] References Cited
UNITED STATES PATENTS
2,496,111   1/1950   Turkel ................................. 128/2 B
2,667,682   2/1954   Stone ............................. 128/347 X
2,639,484   5/1953   Wartman ........................ 128/347 X

*Primary Examiner*—Lawrence W. Trapp
*Attorney*—Eric H. Waters, John G. Schwartz et al.

[57] ABSTRACT

A device for intraosseous injection of liquid substances, wherein the outside tube having a male thread on its end introducible onto osseous tissue and a head at its opposite end, is movably fitted onto the hollow inside tube which has a pointed tip at its end introducible into osseous tissue, oper-end injection holes being provided in a close proximity to said pointed tip. Besides, the outside tube and the tip itself have on their sides facing each other claws or jags directed towards one another and adapted, when the device is being screwed into osseous tissue, to get in engagement with one another so as to close said injection holes and thus prevent them from being clogged with osseous tissue.

4 Claims, 5 Drawing Figures

DEVICE FOR INTRAOSSEOUS INJECTION OF LIQUID SUBSTANCES

This invention relates generally to devices for making injections and has particular reference to devices for intraosseous injection of liquid substances.

Known in the present state of the art are devices for intraosseous injection of liquid substances, comprising an outside hollow tube, an inside tube and a movable restrictor with a lock-pin.

In said known device the working (screwed-in) portion of the outside tube is provided with a male thread and has injection holes, whereas at the other end of said tube provision is made for a cannula the inside solid tube being fitted into the outside one and having a pointed end. Besides, a screw is provided on the outside tube for the device to screw into the osseous tissue.

When assembled (i.e., the inside tube inserted into the outside one) the device is introduced into osseous tissue, whereupon the inside tube is withdrawn, a system for intraosseous injection of liquid substances is connected to the cannula of the outside tube and an injection is carried out.

However, the hitherto-known devices for intraosseous injection of liquid substances suffer from substantial disadvantages which reside in that when said devices are being introduced into osseous tissue the latter is likely to penetrate into the lateral holes of the outside tube and clog these, thus obstructing the injection of liquid.

Said object is accomplished due to the fact that in a device for intraosseous injection of liquid substances, wherein the hollow outside tube having a male thread on its end adapted to be introduced into osseous tissue, is movably fitted onto the inside tube having a pointed tip at its end introducible into that tissue, according to the invention the inside tube is made likewise hollow and has the injection hole located in a close proximity to its tip, and a cannula at the other end thereof, while the outside tube is provided with a head, the outside tube and the pointed tip having on their sides facing each other, claws or jags directed towards one another and adapted, when the device is being screwed into osseous tissue, to engage each other and close said holes, thus preventing their getting clogged with osseous tissue.

It is expedient that a gland seal be provided in the head of the outside tube on the side facing the inside tube.

The outside tube can be provided with a movable restrictor or stop adapted to control the depth of introduction of the device into osseous tissue.

The external surface of the outside tube head and that of the cannula of the inside tube are adapted for being concurrently screwed in or out through the use of the same key.

The herein-proposed device for intraosseous injection of liquid substances enables introducing of liquid into osseous tissue without its flowing back therefrom.

In what follows the invention is made more evident from the disclosure of an exemplary embodiment thereof to be had in conjunction with the accompanying drawings, wherein.

Figure 1:
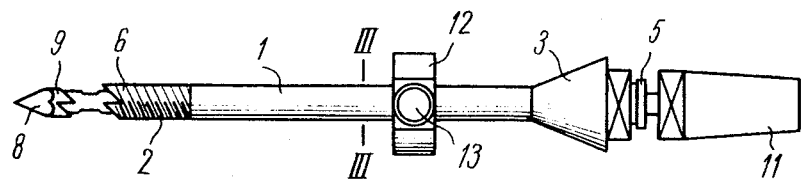
FIG.1 is a general diagrammatic view of a device for intraosseous injection of liquid substances, according to the invention.

Now referring to FIG.1, the device for intraosseous injection of liquid substances comprises an outside tube 1 having a male thread 2 on its effective (introducible) portion, and a head 3.

The head 3 of the outside tube 1 has a gland seal 4 (FIG.2) located on its inside surface and adapted to be fixed by, say, a nut 5 screwed into the head 3, for which a cylindrical recess with a female thread is made in the latter.

The effective portion of the outside tube 1 terminates at its screwed-in end in claws 6.

Figure 2:
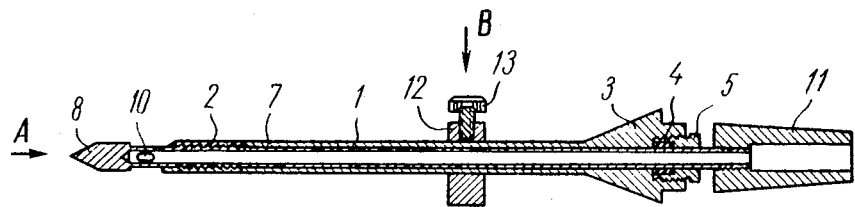
FIG.2 is a central longitudinal-section view of the device, according to the invention.
Figure 3:
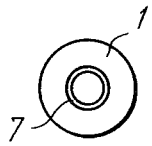
FIG.3 is a cross-sectional view of the device, taken along the line III—III, according to the invention.

Located within the outside tube 1 is a hollow inside tube 7 (FIG.3) having a pointed tip 8 ( FIGS.1,2 ). The diameter of the tip 8 is equal to the minor diameter of the male thread 2 of the outside tube 1.

The tip 8 likewise terminates in claws 9 whose number and shape correspond to those of the claws 6 provided on the outside tube 1. Lateral holes 10 (FIG.2) are provided in the wall of the inside tube 7 nearby the tip 8 to inject liquid substances into osseous tissue. A cannula 11 is provided at the opposite end of the inside tube 7.

The external surface of the head 3 of the outside tube 1 and the external surface of the cannula 11 of the inside tube 7 are made as similar polyhedrons such as tetrahedrons, for simultaneous by screwing the device in or out by using the same key (not shown). Provision is made on the outside tube 1 for a movable restrictor 12 to control the depth of introduction of the device into osseous tissue, said restrictor being fixed in position by a screw 13.

The outside tube 1 is also provided with millimetre graduations applied from the top edge of the thread 2 to the head 3 and serving to accurately measure the depth of introduction of the device into osseous tissue.

The device is introduced into osseous tissue and a liquid substance is injected thereinto in the following way.

The tube 1 is fitted onto the tube 7 as far as a complete engagement of the claws 9 with the claws 6 occurs whereby the holes 10 get fully closed and the tube 1 is kept against turning with respect to the tube 7 when the device is being introduced into osseous tissue. Then the key is applied to the head 3 and the cannula 11, said key at the same time catching and holding the outside tube 1 and the inside tube 7 immovable with respect to each other.

Then soft tissues are pierced to reach the bone, whereupon the restrictor 12 is placed above the pierced skin in the position corresponding to the preset depth of penetration of the device into osseous tissue, and is fixed in that position with the screw 13.

Figure 4:
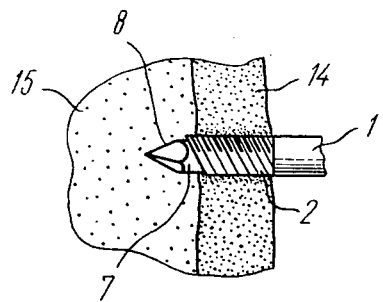
FIGS.4 and 5 illustrate consecutive steps of introducing the device of the invention into osseous tissue.

When rotating the device with the help of the key, say, in a clockwise direction, the tip 8 destructs a compact layer 14 (FIG.4) of the bone, thus establishing a channel for the thread 2 of the outside tube 1 to penetrate. Once the restrictor 12 has touched the skin surface, further penetration of the device as a whole ceases and the key is removed from the head 3 of the outside tube 1, though remaining applied to the cannula 11 of the inside tube 7. At the same time, the outside tube 1 gets fixed in position in osseous tissue by virtue of its thread 2.

Figure 5:
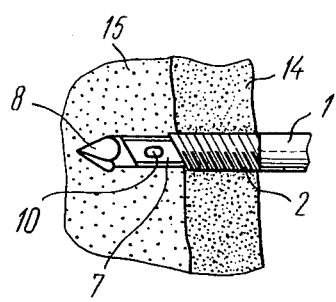

Further clockwise rotation of the inside tube 1 causes it to penetrate deeply into a spongy substance 15 (FIG.5) of the bone, with the result that the claws 6 and 9 get disengaged from one another and the holes 10 become exposed.

Then to the cannula 11 is connected either the syringe or the transfusion system (both not shown).

When liquid substances are pressure-injected, the gland seal 4 (FIG.2) prevents them from flowing back.

To remove the device from the bone, one must rotate it in a reverse direction ( in the given particular example, counterclockwise).

The herein-proposed device for intraosseous injection of liquid substances allows of freely and unimpededly injecting into osseous tissue not only contrast but also any other medicative liquids without their flowing back from the device. This is attained due to the fact that the injection holes of the device are closed during its being introduced into osseous tissue and due to the provision of a gland seal in the head of the outside tube.

The device disclosed herein can find application in diverse branches of machine, particularly, in surgical, traumatological, orthopaedical, neurosurgical, oncological, roentgenological, urological and field medical practice. The proposed device is effective to help also in diagnosing and treating a plurality of heavy carcinomatous diseases.

What is claimed is:

1. A device for intraosseous injection of liquid substances, comprising: an outside tube made hollow and having two ends of which one end is adapted to be introduced into osseous tissue, while the other end is opposite to the former one; said end introducible into osseous tissue having a male thread, terminating in claws and said end opposite to the former one, carrying a head; an inside tube capable of moving within said outside tube, made likewise hollow and having two ends, of which one end is to be introduced into osseous tissue, while the other end is opposite to the former one; said end introducible into osseous tissue having a pointed tip which also terminates in claws that are similar to and directed towards said claws of said outside tube; holes formed in said inside tube proximate to said end introducible into osseous tissue so as to provide passageways for flow of said liquid substances from the interior of said inside tube, said claws of said outside and said inside tubes being adapted, when the device disclosed herein is being screwed into osseous tissue, to be engaged with one another to close said holes, thereby preventing them from being clogged with osseous tissue; and a cannula provided at said opposite end of said inside tube.

2. A device as claimed in claim 1, wherein said head of said outside tube incorporates a gland seal located on the side facing said inside tube and adapted to prevent back flow of the liquid substances being injected.

3. A device as claimed in claim 1, wherein mounted on said outside tube is a movable restrictor adapted to control the depth of introduction of the herein disclosed device into osseous tissue.

4. A device as claimed in claim 1, wherein the external surface of said head of mentioned outside tube and the external surface of said cannula of mentioned inside tube are adapted to be simultaneously screwed in or out by using the same key.

* * * * *